(12) United States Patent
Maes et al.

(10) Patent No.: US 12,405,819 B2
(45) Date of Patent: Sep. 2, 2025

(54) WORKLOAD MIGRATION

(71) Applicant: ENTIT SOFTWARE LLC, Sanford, NC (US)

(72) Inventors: Stephane Herman Maes, Fremont, CA (US); Srikanth Natarajan, Fort Collins, CO (US)

(73) Assignee: Micro Focus LLC, Santa Clara, CA (US)

( * ) Notice: Subject to any disclaimer, the term of this patent is extended or adjusted under 35 U.S.C. 154(b) by 590 days.

(21) Appl. No.: 16/240,858

(22) Filed: Jan. 7, 2019

(65) Prior Publication Data

US 2020/0218566 A1 Jul. 9, 2020

(51) Int. Cl.
*G06F 9/48* (2006.01)
*G06F 9/50* (2006.01)
*H04L 67/1001* (2022.01)

(52) U.S. Cl.
CPC ............ *G06F 9/4856* (2013.01); *G06F 9/505* (2013.01); *H04L 67/1001* (2022.05)

(58) Field of Classification Search
CPC ..... G06F 9/4856; G06F 9/505; H04L 67/1002
See application file for complete search history.

(56) References Cited

U.S. PATENT DOCUMENTS

| | | | | |
|---|---|---|---|---|
| 7,711,980 B1 * | 5/2010 | Scarpello, Jr. | ........ | G06F 9/5027 714/4.1 |
| 9,197,489 B1 | 11/2015 | Vincent | | |
| 9,384,061 B1 * | 7/2016 | Deivanayagam | ..... | G06F 9/5083 |
| 9,672,054 B1 * | 6/2017 | Gupta | ................. | G06F 9/45533 |
| 9,690,615 B2 | 6/2017 | Dong et al. | | |
| 9,766,930 B2 | 9/2017 | Tarasuk-Levin et al. | | |
| 9,811,365 B2 * | 11/2017 | Borthakur | ............. | G06F 9/5083 |
| 10,326,826 B1 * | 6/2019 | Fitzgerald | ................. | G06F 8/65 |
| 10,462,009 B1 * | 10/2019 | Shiramshetti | ........... | H04L 41/12 |
| 10,484,297 B1 * | 11/2019 | McClenahan | ....... | H04L 41/0813 |
| 10,511,540 B1 * | 12/2019 | Norbeck, Jr. | ........... | G06F 3/048 |
| 10,628,075 B1 * | 4/2020 | Samad | .................. | G06F 3/0619 |
| 2004/0088688 A1 * | 5/2004 | Hejlsberg | .................. | G06F 8/51 717/143 |
| 2005/0028017 A1 * | 2/2005 | Janakiraman | ........... | G06F 1/263 713/340 |
| 2011/0161491 A1 * | 6/2011 | Sekiguchi | ............. | G06F 9/4856 709/224 |

(Continued)

FOREIGN PATENT DOCUMENTS

EP 3249889 11/2017

OTHER PUBLICATIONS

Attaoui et al., Multi-Criteria Virtual Machine Placement in Cloud Computing Environments: A literature Review, Feb. 5, 2018 (39 pages).

(Continued)

*Primary Examiner* — Adam Lee
(74) *Attorney, Agent, or Firm* — Sheridan Ross P.C.

(57) ABSTRACT

In some examples, a system migrates, responsive to a request, a workload comprising components and relationships among the components as represented by a topology model, the migrating comprising migrating the workload from the source infrastructure to a target infrastructure, and migrating components of the workload from the source infrastructure to the target infrastructure.

23 Claims, 4 Drawing Sheets

(56) References Cited

U.S. PATENT DOCUMENTS

| | | | |
|---|---|---|---|
| 2011/0307291 A1* | 12/2011 | Rolia | G06Q 10/06 705/7.25 |
| 2011/0314069 A1* | 12/2011 | Alatorre | G06F 16/122 707/827 |
| 2012/0005505 A1* | 1/2012 | Tolia | G06F 1/206 713/320 |
| 2012/0054624 A1* | 3/2012 | Owens, Jr. | H04L 41/22 715/735 |
| 2012/0066389 A1* | 3/2012 | Hegde | G06F 9/4856 709/226 |
| 2012/0089711 A1* | 4/2012 | Zager | G06F 9/4856 709/221 |
| 2012/0137278 A1* | 5/2012 | Draper | G06F 8/65 717/170 |
| 2012/0254433 A1* | 10/2012 | Gujral | G06F 9/5072 709/226 |
| 2013/0067471 A1* | 3/2013 | Kruglick | G06F 9/45558 718/1 |
| 2014/0025704 A1* | 1/2014 | Jin | G06F 11/1458 707/770 |
| 2014/0157363 A1* | 6/2014 | Banerjee | G06F 9/45558 726/2 |
| 2014/0164554 A1* | 6/2014 | Joshi | H04L 67/10 709/217 |
| 2014/0201218 A1* | 7/2014 | Catalano | G06Q 10/0631 707/748 |
| 2014/0372600 A1* | 12/2014 | Archer | G06F 11/36 709/224 |
| 2014/0372615 A1* | 12/2014 | Archer | H04L 67/1029 709/226 |
| 2015/0058486 A1* | 2/2015 | Huang | H04L 47/70 709/226 |
| 2015/0089499 A1* | 3/2015 | Hsuan | G06F 9/45558 718/1 |
| 2015/0096011 A1* | 4/2015 | Watt | H04L 63/0272 726/15 |
| 2015/0124645 A1* | 5/2015 | Yadav | H04L 41/5048 370/254 |
| 2015/0154056 A1* | 6/2015 | Chen | G06F 9/4856 718/103 |
| 2015/0172136 A1* | 6/2015 | Tang | H04L 41/00 709/226 |
| 2015/0296002 A1* | 10/2015 | Pell | G06F 9/505 709/226 |
| 2015/0347183 A1* | 12/2015 | Borthakur | G06F 9/5088 718/105 |
| 2015/0372878 A1* | 12/2015 | Ganesan | H04L 43/16 709/223 |
| 2016/0055038 A1* | 2/2016 | Ghosh | G06Q 10/0631 718/105 |
| 2016/0162339 A1* | 6/2016 | Ghosh | G06F 9/4887 718/105 |
| 2016/0330277 A1* | 11/2016 | Jain | H04L 67/1095 |
| 2017/0024260 A1* | 1/2017 | Chandrasekaran | G06F 9/5088 |
| 2017/0064009 A1* | 3/2017 | Baltar | H04L 67/148 |
| 2017/0302530 A1* | 10/2017 | Wolting | H04L 41/145 |
| 2017/0302532 A1* | 10/2017 | Maes | H04L 63/1416 |
| 2017/0366606 A1* | 12/2017 | Ben-Shaul | H04L 67/1097 |
| 2018/0027058 A1* | 1/2018 | Balle | H03M 7/6023 709/226 |
| 2018/0095802 A1* | 4/2018 | Nguyen | G06F 9/5044 |
| 2018/0129523 A1* | 5/2018 | Bryant | G06F 9/45558 |
| 2018/0136971 A1* | 5/2018 | Dong | G06F 9/45558 |
| 2018/0157472 A1* | 6/2018 | Chen | H04L 41/0806 |
| 2018/0157517 A1* | 6/2018 | Dong | G06F 9/45558 |
| 2018/0176183 A1* | 6/2018 | Shah | H04L 63/0254 |
| 2018/0212896 A1* | 7/2018 | Chang | G06F 9/5077 |
| 2018/0246751 A1* | 8/2018 | Dong | G06F 9/4856 |
| 2018/0287865 A1* | 10/2018 | Gorelik | H04L 41/5048 |
| 2018/0329981 A1 | 11/2018 | Gupte | |
| 2019/0087213 A1* | 3/2019 | Matters | G06F 9/45558 |
| 2019/0235895 A1* | 8/2019 | Ovesea | G06F 9/45558 |
| 2019/0250946 A1* | 8/2019 | Parameshwaran | G06F 9/455 |
| 2019/0280979 A1* | 9/2019 | Jain | G06F 9/45558 |
| 2019/0324786 A1* | 10/2019 | Ranjan | G06F 8/60 |
| 2019/0373052 A1* | 12/2019 | Pollitt | H04L 47/20 |
| 2019/0379613 A1* | 12/2019 | Bernat | H04W 4/24 |
| 2020/0167238 A1* | 5/2020 | Killamsetti | G06F 11/1461 |

OTHER PUBLICATIONS

Cloudendure, How CloudEndure Works, The Technology behind Cloudendure's Disaster Recovery and Live Migration Solutions, 2018 (6 pages).

ETSI, ETSI GS NFV-INF 004 V1.1.1, Network Functions Virtualisation (NFV); Infrastructure; Hypervisor Domain, Jan. 2015 (49 pages).

Google, Live Migration downloaded May 15, 2018 (4 pages) https://cloud.google.com/compute/docs/instances/live-migration#how_does_the_live_migration_process_work.

Microfocus, Cloud and Data Center Server Workload Migration Made Easy, 2018 (4 pages).

Microfocus, Solution Flyer, Hybrid Cloud Management, DevOps—Driven Cloud Management Drives Business Agility, 2017 (4 pages).

Redhat, Red Hat Virtualization, Feature Guide, 2016 (8 pages).

* cited by examiner

WORKLOAD MIGRATION

BACKGROUND

Entities (such as business entities, educational organizations, government agencies, individuals, etc.) can access services of a cloud or other data center. Such services can include a service that offers goods or services, a service that enables access of computing resources such as processing resources, communication resources, and storage resources, and/or other services.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cloud may be designed, provisioned, deployed, and managed by or for an entity for which the cloud was created. As used here, a "cloud" can refer to a collection of resources, such as processing resources (e.g., server computers, processors, etc.), storage resources (e.g., implemented with disk drives, solid state memories, etc.), network resources (e.g., routers, switches, gateways, etc.), programs (e.g., applications, operating systems, firmware, or other machine-executable instructions), virtual resources (such as virtual machines, containers or virtual networks), or other types of resources. A cloud can also include services, such as services according to Platform as a Service (PaaS), services according to Container as a Service (CaaS), and/or other services or functions, which can be available via subscription or request, for example. A cloud can also include physical servers, such as those of a data center.

A PaaS provides a platform allowing users to develop, run, and manage applications without the complexity of building and maintaining the infrastructure. A CaaS provides container-based virtualization and is a cloud service that allows developers to upload, organize, run, scale, manage and stop containers (in which resources are provided) by using a provider's Application Programming Interface (API) calls or a web portal interface.

A cloud with the services (e.g. IaaS or PaaS) that it provides (and workload deployed on it) can be designed, provisioned, deployed, and managed by a cloud service manager (also referred to as a "cloud controller"). An example of a cloud controller is Micro Focus' Cloud Service Automation (CSA) controller, which is part of Micro Focus' Hybrid Cloud Management (HCM) platform. Although reference is made to a CSA controller or HCM controller as an example of a cloud controller, it is noted that other different cloud controllers (systems that provision instances based on a model then can track or manage these instances) can be employed in other implementations.

A cloud can provide (or support provisioning of) services (infrastructure resources or workloads) for consumers of the cloud. A cloud can also provide/support workloads provisioned on resources and services as well as enable interaction with the services. Services (including, e.g., workloads including applications, middleware, operating systems, resources, etc.) can be ordered by customers of the cloud, and the services are provided by the cloud can integrate seamlessly with other products or services in a customer's enterprise, where the services can include solving information technology (IT) infrastructure issues, providing content to provision servers, virtual machines, or other components, and so forth. The services can also support provisioning a customer's (where a customer can refer to a user or a group of users or an enterprise) workloads on the cloud and interaction with the services of the cloud. A customer can also deploy a workload on a cloud, such as by using HCM or a script or other tool.

A cloud controller can deliver services to consumers while utilizing (explicitly or implicitly) a service model of a service that is known to the cloud controller. The service model can be predefined or designed, such as by a user (or multiple users), or by other entities (e.g., other developers or administrators or operators on the cloud service provider side).

The service model can be according to any of multiple flavors, such as declarative or prescriptive blueprints that may describe topologies or steps to provision (and manage) a workload and wiring it to other workloads, services and external systems. Examples of service models include: Topology and Orchestration Standard for Cloud Application (TOSCA), HCM sequential, topology and universal models, CloudFormation, OpenStack Heat, OpenStack python provisioning, Terraforms, and so forth.

Provisioning a service can refer to creating and/or instantiating the service in a system, such as a cloud, for access or use. Creating a service can refer to determining a design of the service, while instantiating the service can refer to creating a concrete instance of the service ("service instance") that can be executed or operated. The provisioning of a service may involve subscribing to resources, services, and/or workloads, and/or deploying workloads and coupling (wiring) the workloads to one another to allow the workloads to communicate with one another.

A service model of a service can include any or some combination of the following: a topology of a service, such as a topology that describes an arrangement of resources (e.g., stack of resources) used by an instance of a service and/or a topology of tasks of the service; a workflow of tasks (e.g., a sequence of tasks); code (machine-readable instructions such as Python logic) that implement the service; and so forth. More generally, a service model of a service can include components of the service ("service components")

and relationships among the service components. The service components can include resources (physical or virtual resources), tasks of a workflow, portions of code, and so forth. Physical resources can include processing resources (e.g., a central processing unit or CPU or a portion of a CPU), communication resources (e.g., routers, switches, load-balancers, etc.), storage resources (e.g., storage devices such as memory devices or persistent storage devices), and so forth. Virtual resources can include virtual machines, virtual networks, virtual storage, containers, functions (e.g., server-less platforms such as Amazon Web Services (AWS) Lambda, Google cloud functions, Azure functions, etc.), and so forth.

A topology of a service can refer to a representation of an arrangement (e.g., an architecture) of service components (e.g., resources, tasks) of the service, where the representation can indicate how the service components are related (as represented by information pertaining to relationships included in the service model) to one another architecturally, operationally, and so forth. For example, a topology can be represented as a tree (or other graph) of nodes, where each node can represent a respective service component, and links between the nodes can represent relationships between the service components. Alternatively, a topology can refer to a representation of how tasks of the service are related to one another. In further examples, a topology can refer to a representation of the combination of the foregoing. Examples of service models include: Topology and Orchestration Standard for Cloud Application (TOSCA), HCM sequential, topology and universal models, CloudFormation, OpenStack Heat, OpenStack Python provisioning, Terraforms, and so forth.

Although reference is made to "clouds" in some examples, it is noted that techniques or mechanisms according to some examples can also be applied to data centers. A "data center" can refer to a collection of servers (or even to just one server), including an application server, a communication server, and/or a storage server.

In some examples, as part of so-called "day-1" operations, a cloud controller can provision services automatically (e.g., in answer to a call such as a call to an Application Programming Interface or API) or at the request of consumers (as part of self-service of the consumers) of a cloud. A consumer (a user or organization, a program, or a machine) of a cloud can also be referred to as a tenant of the cloud. Services created by the cloud controller as part of day-1 operations are known to the cloud controller (e.g., the cloud controller knows the service model with associated lifecycle management APIs, etc., how services were instantiated—i.e., what are the instance elements that have been created and how the instance elements are associated to that model).

The cloud controller is able to perform or delate (e.g. monitoring) so-called "day-2" operations with respect to such realizations or instances of these services. Although referred to as day-2 operations, such operations cover the life span of a service from creation time of the service instance to the end of life of the service instance. During the life span, lifecycle management actions can be performed on the service instance, such as starting or stopping the service instance, upgrading the service instance (such as by applying a program patch), monitoring (for performances, usage and user behavior, security, compliance, etc.) and managing the service instance (e.g. based on policies or other external monitoring or remediation setup. Remediation can include the cloud controller implementing (or being asked to perform) remediation actions. In other examples, other mechanisms can be considered, such as for service instances that are modified during day-2 operations (examples of brown service instances), where the mechanisms can ensure compliance of such modified service instances with a service level agreement (SLA), and/or other actions.

In some cases, there may be service instances created or modified by other system(s) that is (are) distinct from the cloud controller. The cloud controller may not be aware of services created by system(s) distinct from the cloud controller, and thus would not be aware of the service model of the services, and thus would be unable to perform lifecycle management actions with respect to such services.

More generally, along with the services that are to be managed by a cloud controller, there may have already other instances that have been deployed prior to use of the cloud controller in a given setting. Such services may have been created and instantiated by other systems, and/or may have been manually created and instantiated by humans (e.g., using scripts, or may have been modified by other systems, such as another cloud controller, a script, or a PaaS or CaaS service). These services are part of an existing service environment (including a service instance or multiple service instances) that are to be somehow imported for management by the cloud controller. Stated differently, for a cloud controller to perform day-2 operations on services created or instantiated by other systems, the cloud controller would have to somehow be made aware of such services (e.g., what these service instances are and how to manage them and who can see them or manage them). Importing and managing an existing service environment in a cloud is a challenge that many organizations are facing. Existing service environments can include a simple service instance that employs just a single server, or alternatively can include more complex service instances that employ multi-tier application systems that include application servers, storage systems, database servers, firewalls, load balancers, and so forth.

To allow a cloud controller to manage services created or instantiated by another system, a "brown-to-manage" process can be performed, where the brown-to-manage process performs operations to allow management of a service (including a service instance or multiple service instances) having a configuration that was unknown to a cloud controller, either because the service environment was pre-deployed, or was modified by another system or user, or was provisioned by another system or user. Further details are provided in U.S. Pat. No. 10,346,443 issued on Jul. 9, 2019, entitled "Managing Service Instances," filed May 9, 2017, which is herein incorporated by reference. Such a service instance is referred to as a "brown service instance." As part of the brown-to-manage process, a service model of the service can be discovered (or equivalently, derived), e.g., with a system like Micro Focus' Universal Discovery that captures the information in a configuration management database (CMDB), by interrogating (e.g., via API) the originally provisioning system or by capturing knowledge from the human operator or enterprise architect repositories/documents. The discovery of a service model can include inferring the service model of the service instance. Inferring the service model can refer to using information describing a service instance to determine a model of the service instance, such as based on relationships among the service components of the service instance that can be ascertained using the information.

As noted above, the provisioning of a service may involve subscribing to resources, services, and/or workloads, and/or deploying workloads and coupling (wiring) the workloads to one another to allow the workloads to communicate with one another. A workload can be defined by a topology model (or multiple topology models). A "topology model" can refer to a service model or a collection of service models, as discussed above (a service model can also be referred to as a blueprint). A workload also includes a composition of resources, services, and other code with dependency relationship with each other. More generally, a workload can include a composition of workload components (e.g., virtual machines, etc.), as well as dependency relationships among the workload components (e.g., relationships between virtual machines, etc.).

In further examples, a workload can include PaaS and/or CaaS services. A PaaS provides a platform allowing users to develop, run, and manage applications without the complexity of building and maintaining the infrastructure. A CaaS provides container-based virtualization and is a cloud service that allows developers to upload, organize, run, scale, manage and stop containers (in which resources are provided) by using a provider's API calls or a web portal interface.

After a workload is provisioned by a cloud controller or other system, there is then an interest to manage the resulting workload so that a user can modify the workload, retire the workload, reorder services of the workload, monitor the workload (e.g., security monitoring, operational monitoring, usage monitoring, cost monitoring, etc.), remediate issues associated with the workload, and so forth. Although various lifecycle management actions (LCMAs) can be performed by a cloud controller, such as monitoring a service, deleting a service, reconfiguring a service, patching a service, etc., the cloud controller may not be able to perform an LCMA for moving or scaling a workload.

A source or target infrastructure can refer to a data center (or even a machine or set of machines), or a cloud. As examples, migration (move, scale, or burst, as explained below) of a workload can include migration of the workload from a data center to a cloud, from a cloud to a data center, between different clouds, or between different data centers. Note that the migration according to some implementations of the present disclosure is not merely the migration of individual virtual machines (VMs), but of workloads that can include VMs and resources that are part of a topology/service instance.

Different types of workload migrations can be performed using a workload migration controller. The workload that is migrated can include a set of VMs, code, and resources with relationship according to a topology model that is designed or discovered/inferred. Note that migrating a workload involves migrating the components (VMs, code, resources, etc.) while maintaining the topology of the components as defined by the topology model. This differs from merely migrating a set of VMs that does not consider a topology defined by the topology model for a workload.

Moreover, migration of a workload can involve migrating the workload implemented using physical code executed on the source infrastructure in a non-virtualized environment, to a code according to a virtual image executed in a virtualized environment in the target infrastructure. Moreover, migration of a workload can involve migrating the workload implemented using code according to a first virtual image format on the source infrastructure, to a code according to a different second virtual image format executed in a virtualized environment in the target infrastructure. A "virtual image format" can refer to a virtualization technology used to implement a workload. Different virtual image formats can refer to different virtualization technologies, such as different virtualization technologies from different vendors of virtualization platforms.

The workload migration according to some implementations of the present disclosure is a type of LCMA to perform day-2 management (e.g., workload move, scale, or burst).

A first type of workload migration includes moving a workload from the source infrastructure to the target infrastructure. After the workload is moved from the source infrastructure to the target infrastructure, a new instance of the workload is deployed at the target infrastructure, and the original instance of the workload at the source infrastructure can be removed.

A second type of workload migration includes scaling a workload from the source infrastructure to the target infrastructure (a single target infrastructure or multiple target infrastructures). Scaling a workload includes copying instance(s) of the workload to the target infrastructure(s), while keeping the original instance of the workload at the source infrastructure. Scaling may also occur locally (e.g., on a set of resources already available in the same data center or in the same cloud (account).

A third type of workload migration includes bursting a workload from the source infrastructure to the target infrastructure (a single target infrastructure or multiple target infrastructures). Bursting a workload can refer to expanding instance(s) of the workload from the source infrastructure to the target infrastructure(s) (e.g., a cloud or multiple clouds) to meet growing demand for the workload. In a specific example, bursting a workload can refer to scaling to a public cloud.

In accordance with some implementations of the present disclosure, a workload comprising components and relationships among the components as represented by a topology model is deployed on a source infrastructure. The workload represented by the topology model is migrated from the source infrastructure to a target infrastructure.

Figure 1:
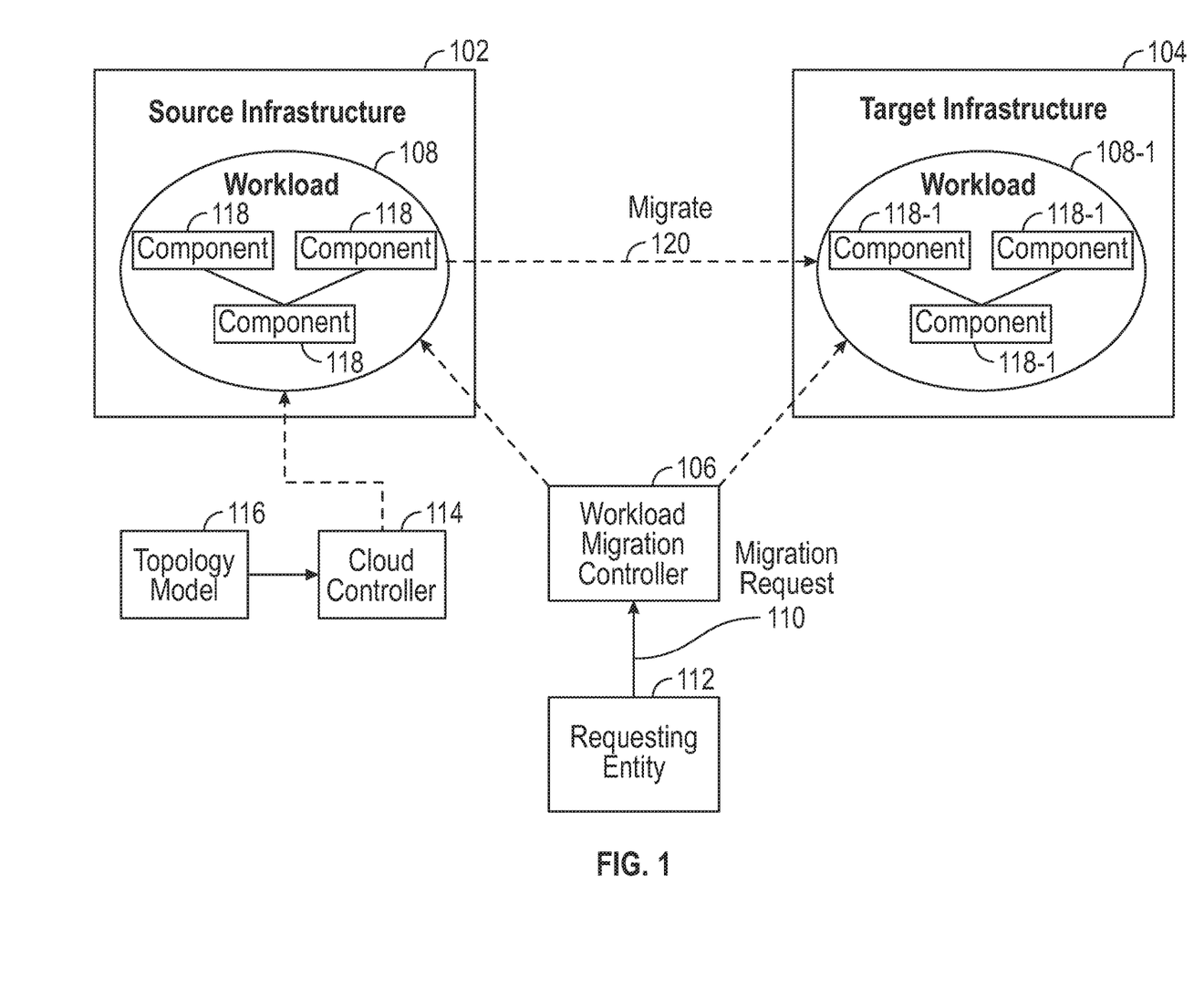
FIG. 1 is a block diagram of an arrangement according to some examples.

FIG. 1 is a block diagram of an example arrangement that includes a source infrastructure 102 and a target infrastructure 104. In addition, a workload migration controller 106 is coupled to the source infrastructure 102 and the target infrastructure 104, such as over a network, to control migration of a workload 108 from the source infrastructure 102 to the target infrastructure 104. The workload may be discovered, brown to managed because provisioned or managed/updated by other systems.

As used here, an "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "controller" can refer to a combination of a hardware processing circuit and machine-readable instructions (software and/or firmware) executable on the hardware processing circuit. A "controller" can also refer to a single computer or a number of computers.

Although FIG. 1 shows just infrastructures 102 and 104, it is noted that in other examples, there can be additional infrastructures.

An "infrastructure" can refer to a computing node or an arrangement of multiple computing nodes that has various physical resources, including processing resources, storage resources, and communication resources. In addition, an "infrastructure" may also include virtual resources. The workload 108 can be deployed using the physical resources and/or virtual resources.

The workload migration controller 106 can receive a migration request 110 from a requesting entity 112. In some cases, a migration request can cause another tool, such as an orchestrator, to call the workload migration controller 106. The orchestrator is used to orchestrate the execution of a workflow.

The requesting entity 112 that requests a workload migration can include a user, an enterprise, a device, a program, or any other entity that is capable of requesting that the workload migration controller 106 migrate a workload between infrastructures, where the workload migration involves migrating the components of the workload while maintaining the relationships between the components according to the topology of the workload.

In some examples, the workload migration controller 106 can include the PlateSpin® Migration Factory from Micro Focus. PlateSpin® Migration Factory automates and integrates the scheduling and execution of cloud and datacenter migration projects. In other examples, other types of workload migration controllers can be used. In other examples, the workload migration controller can be implemented as a stand-alone service.

As further shown in FIG. 1, a cloud controller 114 is able to deploy the workload 108 in the source infrastructure 102, based on a topology model 116 that is accessible by the cloud controller 114 from a topology model repository (implemented with a storage device or multiple storage devices). The topology model may be deployed, tracked, or discovered/inferred due to day-2 management. The topology model 116 can include a service model or multiple service models.

The topology model 116 may be predefined, and thus known to the cloud controller 114. However, in other examples, the topology model 116 may not be known beforehand, such as due to the workload 108 being provisioned by a system different from the cloud controller 114. In such cases, a brown-to-manage process can be performed to discover or derive a topology model. The derivation of the topology model can include inferring the topology model of the workload 108. Inferring the topology model can refer to using information describing the workload 108 to determine a model of the workload, such as based on relationships among the components of the workload that can be ascertained using the information.

In other examples, instead of using the cloud controller 114 to deploy the workload 108, a different system can be used to create the workload 108, or to modify another workload produced by a cloud controller to produce the workload 108 (as part of a day-2 operation discussed above, for example).

As shown in FIG. 1, the workload 108 includes a number of workload components 118 that are related to one another based on dependency relationships among the workload components. In response to the migration request 110, the workload migration controller 106 migrates (120) the workload 108 from the source infrastructure 102 to the target infrastructure 104. The migrated workload is referred to as workload 108-1, and the components of the migrated workload 108-1 are referred to as components 118-1. Note that the migration (120) can include a move operation, a scale operation, or a burst operation.

Migrating the workload 108 from the source infrastructure 102 to the target infrastructure 104 includes migrating the components 118 of the workload 108 from the source infrastructure 102 to the target infrastructure 104. In some examples, all of the components 118 of the workload 108 are migrated from the source infrastructure 102 to the target infrastructure 104.

In other examples, a subset of the components 118 is migrated from the source infrastructure 102 to the target infrastructure 104, while a remainder of the components 118 remains at the source infrastructure 102. For example, in some cases, a given component (or components) of the workload 108 may not be migrated, such as due to the given component(s) providing a core service at the source infrastructure 102. In such cases, the given component(s) is (are) not migrated to the target infrastructure 104, but rather remains at the source infrastructure 102. A discussion of how such a situation is handled is provided further below.

In specific examples, the workload migration from the source infrastructure 102 to the target infrastructure 104 can be between data centers (or between machines or sets of machines), from a data center (or a machine or set of machines) to a cloud, or from a cloud to a data center (or a machine or set of machines). In other examples, the workload migration can include a migration from the source infrastructure 102 where the workload 108 is deployed on physical resources, to the target infrastructure 104 where the workload 108-1 is deployed on virtual resources. In other examples, the workload migration can include a migration from the source infrastructure 102 where the workload 108 is deployed on virtual resources of a first virtual image format, to the target infrastructure 104 where the workload 108-1 is deployed on virtual resources of a second virtual image format. A "virtual image format" refers to a definition or configuration that specifies an arrangement of virtual resources on which a workload is defined. The first virtual image format can be the same as or different from the second virtual image format.

In further examples, the workload migration controller 106 can be a service that can be invoked by the cloud controller 114. For example, the topology model 116 can include LCMAs associated with nodes of the topology model, where the nodes represent components of the workload 108. The LCMAs can be invoked as part of management of the workload 108 as part of the day-2 operations discussed above. The LCMAs of in the topology model include migration actions, such a moving, scaling, or bursting. Thus, as part of day-2 operations, the cloud controller 114 can invoke the workload migration controller 106 to perform a requested migration. In some cases, associating LCMAs with the nodes of the topology model allows auto-migration to be performed, where auto-migration of a workload refers to migrating the workload without an explicit request from a user, e.g., triggered by a remediation engine (that performs remediation of issues, or requested by another entity, such as system heuristics rules, a decision engine or artificial intelligence (AI) system, and so forth. The auto-migration allows implementing a PaaS or CaaS behavior for any workload, not just workloads that would run on a CaaS or PaaS (e.g., cloud native and containerized workloads) and thus subject to restrictions imposed by CaaS or PaaS.

In some examples, the workload migration controller 106 that is implemented as a service can be accessed with the cloud controller 114 (or another system) calling an API to trigger migration of a workload.

The workload migration performed by the workload migration controller 106 involves orchestrating all the components of the topology of the workload to be migrated. An example component includes a database, in which synchronization of data in the database may be performed to a new database at the target infrastructure instead of migrating the database. Alternatively, the migrated workload can be reconfigured to point to the database that can remain at the source infrastructure. The network addresses of components may be reconfigured (such as by changing or assigning new Internet Protocol (IP) addresses). Also, re-routing or reconfiguring a proxy can be performed to redirect to the components of the workload after the migration. Also, load balancing between components may be performed. As an example, an orchestrator can call the workload migration controller 106 to migrate the different components of the workload (in series or in parallel or according to dependencies), and the orchestrator can reconfigure applications and routers/proxies, and can provision and trigger synchronization of databases.

As further discussed below, the migration can involve a two-step migration which involves a coarse migration followed by a delta migration of the workload. In other examples, a one-step migration can be performed where the coarse and delta migrations are combined.

Figure 2A:
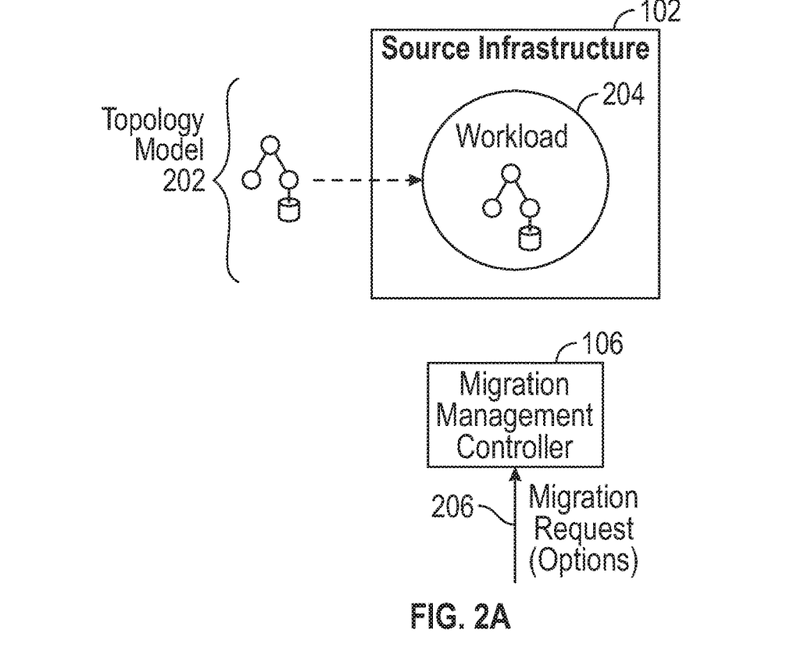
FIGS. 2A and 2B are block diagrams illustrating an example of moving a workload from a source infrastructure to a target infrastructure, according to some examples.
Figure 2B:
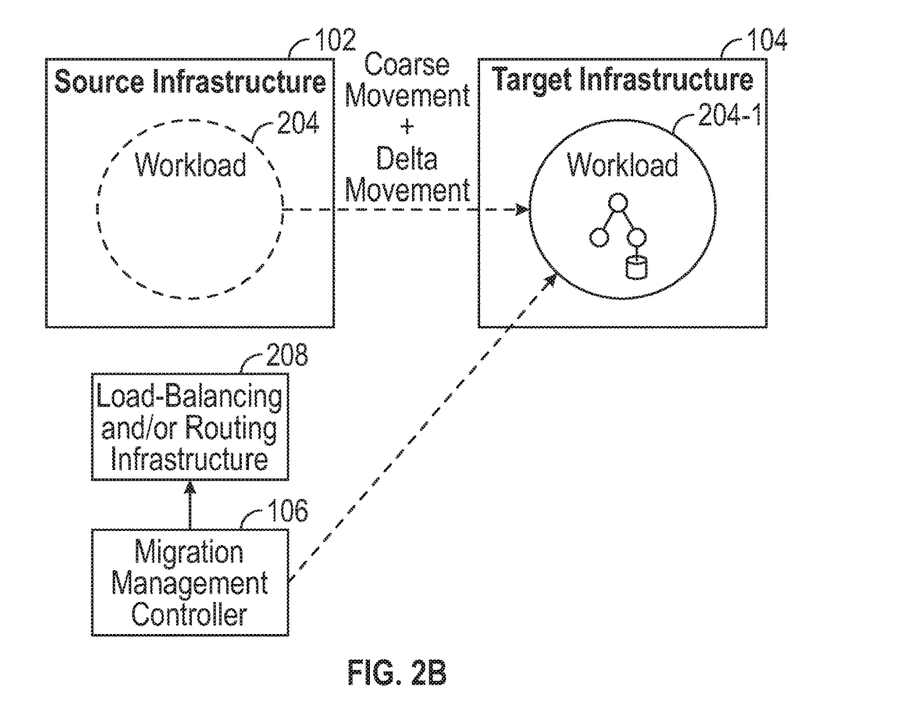

FIGS. 2A and 2B are block diagrams of an example of performing a move of a workload between the source infrastructure 102 and the target infrastructure 104. FIG. 2A shows a state prior to the move, and FIG. 2B shows a state after the move of the workload. FIG. 2A shows a topology model 202 that is used for deploying a workload 204 based on the topology model 202. The deployment of the workload 204 based on the topology model 202 can be performed by the cloud controller 114 of FIG. 1 or a different system.

As further shown in FIG. 2A, the workload migration controller 106 receives a migration request 206 to request the move of the workload 204 from the source infrastructure 102 to the target infrastructure 104. The migration request 206 can include options for the migration. The options can include information identifying the target infrastructure 104 to which the workload instance 204 is to be moved, a type of the migration (e.g., a move, a scale, or a burst), and other options.

In response to the migration request 206, the workload migration controller 106 can orchestrate calls, such as to an API, to trigger the move of each of the workload components of the workload instance 204 from the source infrastructure 102 to the target infrastructure 104. The workload migration controller 106 can provision resources (e.g., processing resources, storage resources, communication resources, etc.) on the target platform 104 to support the workload 204 once migrated.

As part of the migration, the workload migration controller 106 causes a coarse movement of workload data of the workload 204 from the source infrastructure 102 to the target infrastructure 104. The coarse movement of the workload 204 includes performing a coarse copy of a snapshot of workload data associated with each component of the workload 204. For example, the snapshot of workload data can include data that is being operated upon (e.g., data that is read and/or written) by the workload 204, information pertaining to the states of various components of the workload 204, and so forth. The snapshot of workload data represents the workload data at a particular point in the time, which in the case is the point in time at which the movement of the workload 204 was initiated by the migration management controller 106 in response to the migration request 206.

It is noted that the workload data may change as the workload 204 continues to operate while the migration is in progress. Thus, the coarse copying of the workload data is intended to move the majority of the workload data from the source infrastructure 102 to the target infrastructure 104, in anticipation of the fact that some part of the workload data may change between the time that the coarse movement of the workload instance 204 is performed and the time at which the workload movement is completed.

FIG. 2B also shows a load-balancing and/or routing infrastructure 208, which performs various tasks relating to distributing or forwarding data to a workload. Routing tasks can include forwarding data packets based on network addresses (e.g., Internet Protocol (IP) addresses or Medium Access Control (MAC) addresses and/or other fields of the data packets). For example, based on values of field(s) of a data packet, a router of the load-balancing and/or routing infrastructure 208 can select a network path to which the data packet is routed.

A load balancer of the load-balancing and/or routing infrastructure 208 can perform load balancing of data packets associated with a communication flow of a workload across multiple different network paths.

Before completion of the movement of the workload 204, data packets that are targeted to the workload 204 are directed by the load-balancing and/or routing infrastructure 208 to a network address (e.g., an IP address, a MAC address, etc.) associated with the workload 204 at the source infrastructure 102.

The workload after the movement to the target infrastructure 104 is referred to as 204-1 in FIG. 2B.

Configuration of this may be done for example with an orchestrator.

Once the coarse copy of the workload data of the workload 204 has been made to the target infrastructure 104, the workload migration controller 106 can perform a delta movement of the workload data to the target infrastructure 104. The delta movement includes copying just the part of the workload data (for each component of the workload) that has changed since the coarse copy. The workload data that has changed can include data that is being operated upon by the workload 204, and state data associated with the components of the workload 204.

Once the delta movement has been performed, the migrated workload 204-1 can start to operate in the target infrastructure 104. The migration management controller 106 can perform an automated process (e.g., without human input) to configure the load-balancing and/or routing infrastructure 208 to direct data packets for the migrated workload 204-1 to network address(es) associated with the component(s) of the migrated workload 204-1 in the target infrastructure 104.

In some examples, the topology model 202 can include information regarding which network address(es) is (are) to be reconfigured if migration of the workload occurs. For example, the topology model 202 can expose an API that can be called by the migration management controller 106 to determine which network address(es) are to be changed once the workload 108 is migrated from the source infrastructure 102 to the target infrastructure 104.

In other examples, instead of configuring the load-balancing and/or routing infrastructure 208, the migration management controller 106 can configure a network address(es) (e.g., IP address(es), MAC address(es), etc.) used by a program (or programs), such as an application program, to direct data packets to the components of the workload 104-1 in the target infrastructure 104.

Once the movement of the workload 204 is complete, the workload 204 (and its associated workload data) can be deleted from the source infrastructure 102 (as indicated by the dashed profile of the workload 204 in FIG. 2A).

In the foregoing example, it is assumed that all of the components of the workload 204 can be migrated from the source infrastructure 102 to the target infrastructure 104.

In other examples, a component or multiple components of the workload 204 may not be migrateable from the source infrastructure 102 to the target infrastructure 104. In such cases, the workload migration controller 106 can configure the load-balancing and/or routing infrastructure 208 can configure the load-balancing and/or routing infrastructure 208 to direct data packets selectively to the non-migrated component(s) of the workload 204-1 in the source infrastructure 102 or to the migrated component(s) of the workload 204-1 in the target infrastructure 104. Alternatively, the workload migration controller 106 can configure network address(es) used by a program (or programs) to direct data packets to components of the workload 204-1 in the source infrastructure 102 and the target infrastructure 104.

In examples where the migration involves scaling or bursting, the original workload 204 in the source infrastructure 102 is not removed, but rather is kept operational and new workloads elsewhere provide the contributions that scale out the workload.

Figure 3:
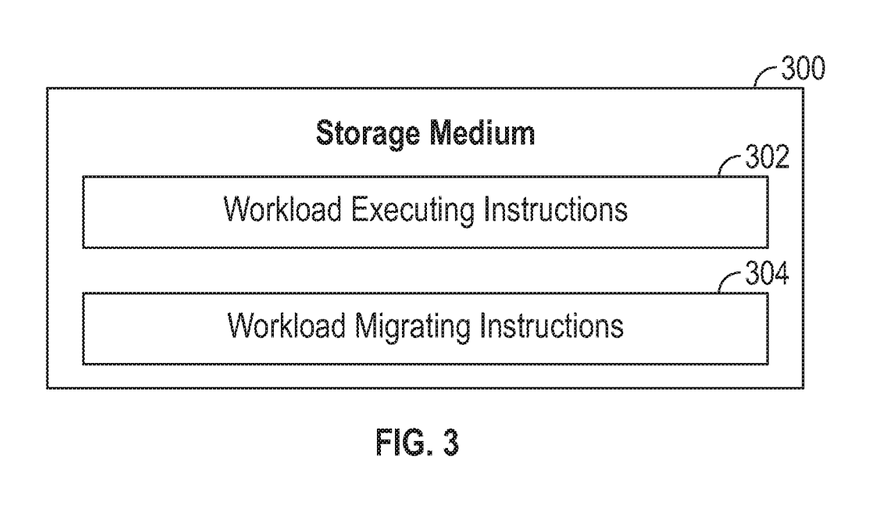
FIG. 3 is a block diagram of a storage medium storing machine-readable instruction according to some examples.

FIG. 3 is a block diagram of a non-transitory machine-readable or computer-readable storage medium 300 comprising machine-readable instructions that upon execution cause a system to perform various tasks. The machine-readable instructions include workload executing instructions 302 to execute, on a source infrastructure, a workload comprising components and relationships among the components, the workload corresponding to a topology model.

The machine-readable instructions further including workload migrating instructions 304 to migrate, responsive to a request, the workload represented by the topology model from the source infrastructure to a target infrastructure, wherein migrating the workload comprises migrating components of the workload from the source infrastructure to the target infrastructure.

Figure 4:
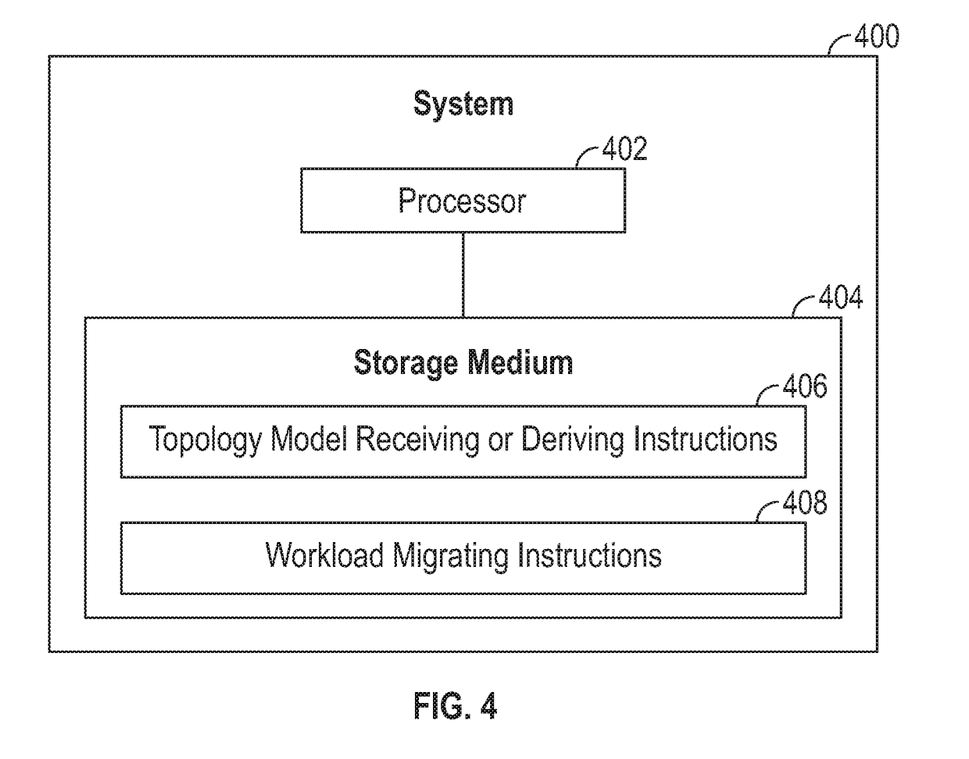
FIG. 4 is a block diagram of a system according to some examples.

FIG. 4 is a block diagram of a system 400 including a hardware processor 402 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include topology model receiving or deriving instructions 406 to receive or derive a topology model that represents a workload comprising components and relationships among the components. The machine-readable instructions further include workload migrating instructions 408 to migrate, responsive to a request, the workload represented by the topology model from a source infrastructure to a target infrastructure, where migrating the workload comprises migrating components of the workload from the source infrastructure to the target infrastructure.

Figure 5:
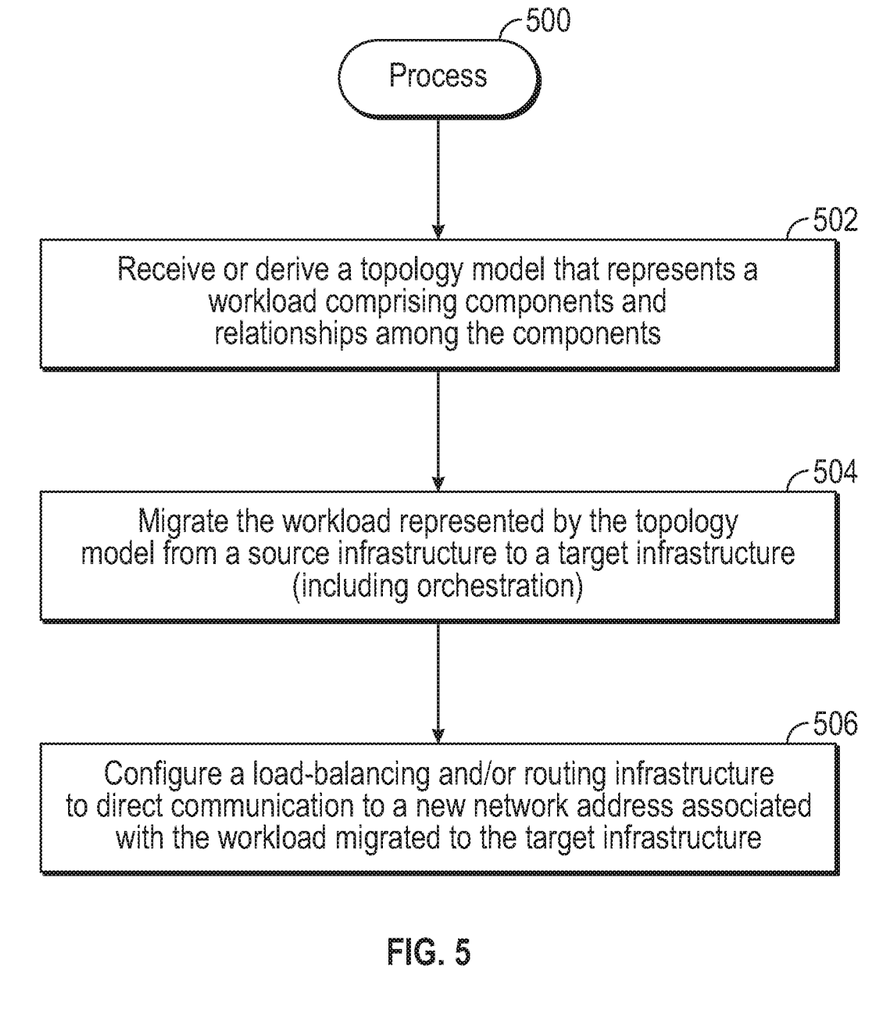
FIG. 5 is a flow diagram of a process according to some examples.

FIG. 5 is a flow diagram of a process 500 according to some examples. The process 500 can be performed by a system comprising a hardware processor, such as by a system including the workload migration controller 106.

The process 500 includes receiving or deriving (at 502) a topology model that represents a workload comprising components and relationships among the components.

The process 500 includes migrating (at 504) the workload represented by the topology model from a source infrastructure to a target infrastructure. The migration of the workload includes orchestration of components of the workload as performed by an orchestrator.

The process 500 further includes configuring (at 506) a load-balancing and/or routing infrastructure to direct communication to a new network address associated with the workload migrated to the target infrastructure.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   discover, responsive to receiving a migration request, a topology model by analyzing service model configuration information describing one or more previously instantiated and provisioned service instances of a workload of a corresponding service model previously instantiated and provisioned by a source infrastructure, the one or more previously instantiated and provisioned service instances comprising multiple related service components of the corresponding service model and comprising resources and tasks and the topology model representing dependency relationships among the multiple related service components; and
   migrate, responsive to the discovery of the topology model and based on the topology model, the workload from the source infrastructure to a target infrastructure different from the source infrastructure, and the multiple related service components of the workload from the source infrastructure to the target infrastructure.

2. The non-transitory machine-readable storage medium of claim 1, wherein the corresponding service model comprises one of Topology and Orchestration Standard for Cloud Application (TOSCA), HCM Sequential, topology and universal models, CloudFormation, OpenStack Heat, OpenStack Python provisioning, and Terraforms, wherein the topology model comprises a graph of interconnected nodes, each interconnected node representing a respective service component, with interconnections representing an operational relationship between the interconnected nodes, wherein the topology model comprises information regarding which network address(es) is/are to be reconfigured if a migration of the workload occurs, and wherein the instructions upon execution cause a system to:

interrogate, by an application programming interface, the workload to collect the service model configuration information; and     deploy the workload on the source infrastructure by a cloud controller based on the topology model.

3. The non-transitory machine-readable storage medium of claim 1, wherein the one or more previously instantiated and provisioned service instances of the workload comprises plural Day-2 operations of the corresponding service model, wherein the topology model comprises a declarative or prescriptive blueprint, wherein the instructions upon execution cause a system to:

burst the workload from the source infrastructure to the target infrastructure, whereby the workload is maintained at the source infrastructure and one or more new service instances of the workload at the target infrastructure provides a workload contribution that scales the workload.

4. The non-transitory machine-readable storage medium of claim 1, wherein the multiple related service components of the workload comprise an arrangement of resources and resource executable service code, wherein the migrating is performed by a migration controller as a service, wherein the migrating involves orchestrating all components of a topology of the workload to be migrated and provisioning resources on the target infrastructure to support the workload once migrated, and further comprising instructions that upon execution cause the system to:

after migrating, deploy one or more new service instances of the workload at the target infrastructure; and     after migrating, delete the one or more previously instantiated and provisioned service instance of the workload at the source infrastructure.

5. The non-transitory machine-readable storage medium of claim 4, wherein instantiation of the workload comprises creating a concrete instance of a service, wherein provisioning of the workload comprises subscribing to one or more resources, services, and/or workloads, wherein the multiple related service components of the workload comprise an arrangement of virtual machines, and wherein the instructions that upon execution cause a system to:

before, during, or after the migrating, perform at least one of: synchronization of data in a database, reconfiguring network addresses of components, or load balancing between components.

6. The non-transitory machine-readable storage medium of claim 1, wherein the topology model refers to one or more service models, wherein migrating the workload comprises:

copying the workload from the source infrastructure to the target infrastructure as part of scaling out the workload, wherein, during the migration, dependency relationships among the multiple related service components are maintained among the multiple related service components according the topology model.

7. A system comprising:

a processor; and a non-transitory machine-readable storage medium storing instructions executable on the processor to:

derive, responsive to receiving a migration request, a topology model by analyzing service model configuration information describing one or more previously instantiated and provisioned service instances of a workload of a corresponding service model previously instantiated and provisioned by a source infrastructure, the one or more previously instantiated and provisioned workload service instances comprising multiple related service components of the corresponding service model and comprising resources and tasks and the topology model represents dependency relationships among the multiple related service components; and     migrate, responsive to the derivation and based on the topology model, the workload represented by the topology model from the source infrastructure to a target infrastructure different from the source infrastructure, wherein migrating the workload comprises migrating multiple related service components of the workload from the source infrastructure to the target infrastructure.

8. The system of claim 7, wherein the topology model comprises a graph of interconnected nodes, each interconnected node representing a respective service component, with interconnections representing an operational relationship between the interconnected nodes, wherein the topology model comprises information regarding which network address(es) is/are to be reconfigured if a migration of the workload occurs, and wherein the source infrastructure comprises a data center or a cloud, and the target infrastructure comprises a data center or a cloud different from the data center or the cloud of the source infrastructure.

9. The system of claim 7, wherein the corresponding service model comprises one of Topology and Orchestration Standard for Cloud Application (TOSCA), HCM Sequential, topology and universal models, CloudFormation, OpenStack Heat, OpenStack Python provisioning, and Terraforms, wherein the topology model comprises a graph of interconnected nodes, each interconnected node representing a respective service component, with interconnections representing an operational relationship between the interconnected nodes, wherein the topology model comprises information regarding which network address(es) is/are to be reconfigured if a migration of the workload occurs, and wherein the instructions are executable on the processor to:

interrogate, by an application programming interface, the workload to collect the service model configuration information; and     deploy the workload on the source infrastructure based on the topology model.

10. The system of claim 7, wherein the one or more previously instantiated and provisioned service instances of the workload comprises plural Day-2 operations of the corresponding service model, wherein the topology model comprises a declarative or prescriptive blueprint, wherein the instructions are executable on the processor to:

burst the workload from the source infrastructure to the target infrastructure, whereby the workload is maintained at the source infrastructure and one or more new service instances of the workload at the target infrastructure provides a workload contribution that scales the workload.

11. The system of claim 7, wherein the multiple related service components of the workload comprise an arrangement of resources and resource executable service code, and wherein the instructions are executable on the processor to migrate the workload by:

performing a coarse copy of a state and data of the workload from the source infrastructure to the target infrastructure; and performing a delta copy of the state and data of the workload from the source infrastructure to the target infrastructure, the delta copy comprising copying changes in value of the state and data of the workload relative to the coarse copy.

12. The system of claim 7, wherein migrating the workload from the source infrastructure to the target infrastructure comprises migrating the workload from being deployed on physical resources of the source infrastructure to being deployed on virtual resources of the target infrastructure, wherein, during the migration, the dependency relationships among the multiple related service components are maintained among the multiple related service components according the topology model and wherein the instructions, when executed, cause the processor to:

after migrating, deploy one or more new service instances of the workload at the target infrastructure; and after migrating, delete the one or more previously instantiated and provisioned service instance of the workload at the source infrastructure.

13. The system of claim 7, wherein the multiple related service components of the workload comprise an arrangement of virtual machines, wherein instantiation of the workload comprises creating a concrete instance of a service, wherein provisioning of the workload comprises subscribing to one or more resources, services, and/or workloads, and wherein migrating the workload from the source infrastructure to the target infrastructure comprises migrating the workload from being deployed on virtual resources of a first virtual image format on the source infrastructure to being deployed on virtual resources of a second virtual image format on the target infrastructure, the first virtual image format being the same as or different from the second virtual image format.

14. The system of claim 7, wherein, during the migrating, the dependency relationships among the multiple related service components are maintained among the multiple related service components according the topology model and wherein the instructions upon execution cause the processor to:

configure, before, during or after the migrating, one or more of:
load-balancing,
synchronizing a database, or
routing infrastructure or reconfigure a component to assign a new network address to the component, so that communications are directed to the new network address.

15. The system of claim 7, wherein the topology model refers to one or more service models, wherein, during the migrating, the dependency relationships among the multiple related service components are maintained among the multiple related service components according the topology model and wherein the instructions upon execution cause the system to:

determine that a first component of the workload is not migrateable to the target infrastructure or that the first component of the workload is to be kept at the source infrastructure; and configure a load-balancing and/or routing infrastructure or reconfigure a network address used by a program to direct communications to a migrated portion of the workload at the target infrastructure and to the first component at the source infrastructure.

16. A method performed by a system comprising a hardware processor, comprising:

deriving, responsive to receiving a migration request, a topology model by collecting and storing in a configuration management database and analyzing service model configuration information describing one or more previously instantiated and provisioned service instances of a workload of a corresponding service model previously instantiated and provisioned by a source infrastructure, the one or more previously instantiated and provisioned workload service instances comprising multiple related service components of the corresponding service model and comprising resources and tasks and the topology model representing dependency relationships among the multiple related service components;

migrating, responsive to the derivation and based on the topology model, the multiple related service components of the workload represented by the topology model from the source infrastructure to a target infrastructure different from the source infrastructure; and configuring a load-balancing and/or routing infrastructure based on the topology model to direct communication to a new network address associated with the workload migrated to the target infrastructure.

17. The method of claim 16, wherein the topology model comprises a graph of interconnected nodes, each interconnected node representing a respective service component, with interconnections representing an operational relationship between the interconnected nodes, wherein the topology model comprises information regarding which network address(es) is/are to be reconfigured if a migration of the workload occurs, and further comprising:

interrogating, by an application programming interface (API), the workload to collect the service model configuration information; and calling the API to trigger the migrating.

18. The method of claim 17, wherein the topology model comprises a declarative or prescriptive blueprint, wherein the one or more previously instantiated and provisioned service instances of the workload comprises plural Day-2 operations of the corresponding service model and wherein the migrating is performed by a migration service that is invoked responsive to the calling of the API.

19. The method of claim 16, wherein the corresponding service model comprises one of Topology and Orchestration Standard for Cloud Application (TOSCA), HCM Sequential, topology and universal models, CloudFormation, OpenStack Heat, OpenStack Python provisioning, and Terraforms and wherein the migrating comprises auto-migration that provides a Platform as a Service (PaaS) behavior and/or a Container as a Service (CaaS) behavior for a workload without restrictions imposed by PaaS and/or Caas and further comprising:

bursting the workload from the source infrastructure to the target infrastructure, whereby the workload is maintained at the source infrastructure and one or more new service instances of the workload at the target infrastructure provides a workload contribution that scales the workload.

20. The method of claim 16, wherein the topology model refers to one or more service models, wherein the multiple related service components of the workload comprise an arrangement of resources and resource executable service code, and wherein migrating the workload comprises:

performing a coarse copy of a state and data of each component of the workload from the source infrastructure to the target infrastructure; and performing a delta copy of the state and data of each component of the workload from the source infrastructure to the target infrastructure, wherein performing the delta copy of the state and data of the workload from the source infrastructure to the target infrastructure comprises copying a change in values of the state and data of the workload between a current state and data of the workload and the state and data copied in the coarse copy.

21. The method of claim 16, wherein instantiating the workload comprises creating a concrete instance of a service, wherein provisioning of the workload comprises coupling first and second workloads to each other to enable the first and second workloads to communicate with each other, wherein migrating the workload comprises:

associating a lifecycle management action with the topology model, the lifecycle management action comprising a migration action to perform the migrating of the workload; and performing the lifecycle management action to perform the migrating.

22. The method of claim 21, wherein the lifecycle management action enables auto-migration of the workload triggered by a system and provisioning resources on the target infrastructure to support the workload once migrated, and further comprising:

after migrating, deploying one or more new service instances of the workload at the target infrastructure; and after migrating, deleting the one or more previously instantiated and provisioned service instance of the workload at the source infrastructure.

23. The method of claim 16, wherein the one or more previously instantiated and provisioned service instances of the workload comprises plural Day-1 operations of the corresponding service model and wherein components of the workload comprise virtual machines, a service, and a resource that are interrelated by relationships.

* * * * *